Figure 1:
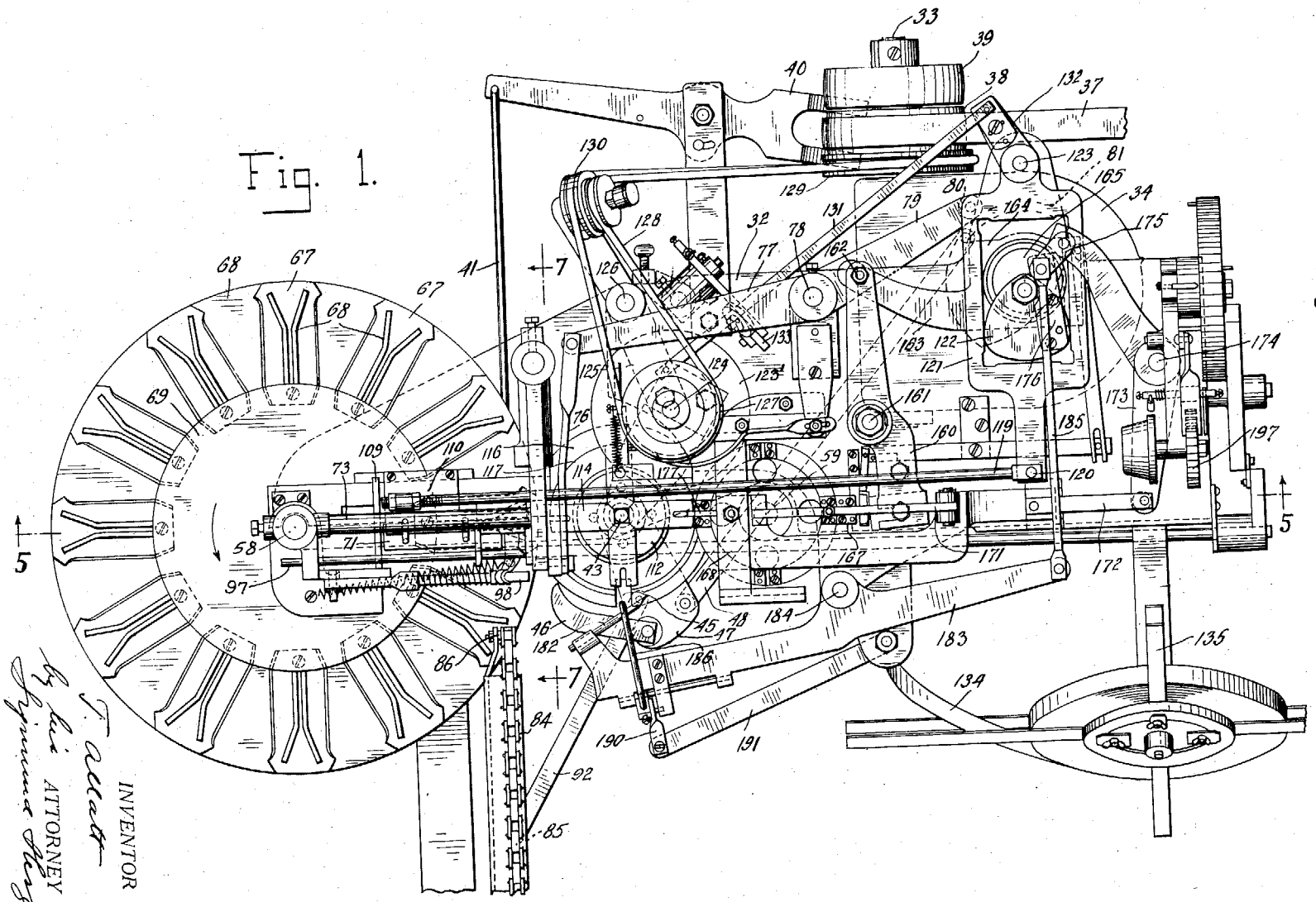

March 13, 1928.

T. ALLATT

BAG CLOSING MACHINE

Re. 16,897

Original Filed Sept. 26, 1922

17 Sheets-Sheet 1.

INVENTOR

T. Allatt by his ATTORNEY

Symmes Hersog

March 13, 1928. T. ALLATT Re. 16,897

BAG CLOSING MACHINE

Original Filed Sept. 26, 1922 17 Sheets-Sheet 2

Inventor
T. Allatt
By his Attorney
Sigmund Herzog

March 13, 1928. T. ALLATT Re. 16,897

BAG CLOSING MACHINE

Original Filed Sept. 26, 1922 17 Sheets-Sheet 3

Inventor
T. Allatt
By his Attorney
Sigmund Herzog

March 13, 1928.

T. ALLATT

BAG CLOSING MACHINE

Original Filed Sept. 26, 1922

Re. 16,897

17 Sheets-Sheet 4

INVENTOR

T. Allatt

BY

Sigmund Stern ATTORNEY

March 13, 1928. T. ALLATT Re. 16,897

BAG CLOSING MACHINE

Original Filed Sept. 26, 1922 17 Sheets-Sheet 5

Inventor
T. Allatt
By his Attorney
Sigmund Shipow

March 13, 1928.

T. ALLATT

BAG CLOSING MACHINE

Original Filed Sept. 26, 1922

Re. 16,897

17 Sheets-Sheet 6

Inventor
T. Allatt
By his Attorney
Sigmund Sherzer

March 13, 1928. T. ALLATT Re. 16,897

BAG CLOSING MACHINE

Original Filed Sept. 26, 1922 17 Sheets-Sheet 7

Inventor
T. Allatt
By his Attorney
Sigmund Herzog

March 13, 1928.

T. ALLATT

BAG CLOSING MACHINE

Re. 16,897

Original Filed Sept. 26, 1922

17 Sheets-Sheet 8

Inventor

T. Allatt

By his Attorney

Sigmund Herzog

March 13, 1928. T. ALLATT Re. 16,897

BAG CLOSING MACHINE

Original Filed Sept. 26, 1922 17 Sheets-Sheet 9

Inventor
T. Allatt

By his Attorney
Sigmund Sherzog

March 13, 1928. T. ALLATT Re. 16,897

BAG CLOSING MACHINE

Original Filed Sept. 26, 1922 17 Sheets-Sheet 10

Inventor
T. Allatt
by Lynnwell Sayers
Attorney

March 13, 1928. T. ALLATT Re. 16,897

BAG CLOSING MACHINE

Original Filed Sept. 26, 1922 17 Sheets-Sheet 11

Inventor
T. Allatt
By his Attorney
Sigmund Herzog

March 13, 1928. T. ALLATT Re. 16,897

BAG CLOSING MACHINE

Original Filed Sept. 26, 1922 17 Sheets-Sheet 12.

Inventor
T. Allatt
By his Attorney
Symmes Herzog

March 13, 1928. T. ALLATT Re. 16,897

BAG CLOSING MACHINE

Original Filed Sept. 26. 1922 17 Sheets-Sheet 13

Inventor
T. Allatt
By his Attorney
Sigmund Herzog

March 13, 1928. T. ALLATT Re. 16,897

BAG CLOSING MACHINE

Original Filed Sept. 26, 1922 17 Sheets-Sheet 14

Inventor
T. Allatt
By his Attorney
Sigmund Herzog

March 13, 1928.

T. ALLATT

BAG CLOSING MACHINE

Re. 16,897

Original Filed Sept. 26, 1922 17 Sheets-Sheet 15

Inventor
T. Allatt
By his Attorney
Sigmund Herzog

March 13, 1928. T. ALLATT Re. 16,897

BAG CLOSING MACHINE

Original Filed Sept. 26, 1922 17 Sheets-Sheet 16

Inventor

T. Allatt

By his Attorney

Sigmund Herzog

March 13, 1928. T. ALLATT Re. 16,897

BAG CLOSING MACHINE

Original Filed Sept. 26, 1922 17 Sheets-Sheet 17

Inventor
T. Allatt

By his Attorney
Sigmund Herzog

Reissued Mar. 13, 1928.

Re. 16,897

UNITED STATES PATENT OFFICE.

THOMAS ALLATT, OF WESTFIELD, NEW JERSEY, ASSIGNOR, BY MESNE ASSIGNMENTS, TO MILLIE PATENT HOLDING CO. INC., OF NEW YORK, N. Y., A CORPORATION OF NEW YORK.

BAG-CLOSING MACHINE.

Original No. 1,637,509, dated August 2, 1927, Serial No. 590,622, filed September 26, 1922. Renewed October 23, 1926. Application for reissue filed January 17, 1928. Serial No. 247,433.

The present invention relates to improvements in machines for closing bags. It pertains more particularly to a machine for closing bags of the type described in U. S. Letters Patent No. 1,395,642, granted to Benjamin Hirschhorn on November 1, 1921. In the said patent a bag is described, constituting a cartridge for percolating or extracting the flavor from tea-leaves or coffee, said cartridge comprising a bag having its mouth drawn into folds or puckered, in combination with a metal strip that encircles and compresses said folds. The metal strip serves also to attach to the cartridge a string, to the free end of the latter being secured a handle.

The main object of the present invention is to provide a simple and easily operable mechanism, whereby the mouth of an already filled bag is closed by puckering the same and applying thereto a metal band, in the form of a ring, that embraces the puckered portion of the bag, so as to prevent escaping of the contents.

Another object of the invention is to provide a bag closing machine of the character mentioned, which is automatic in its operation.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 2:
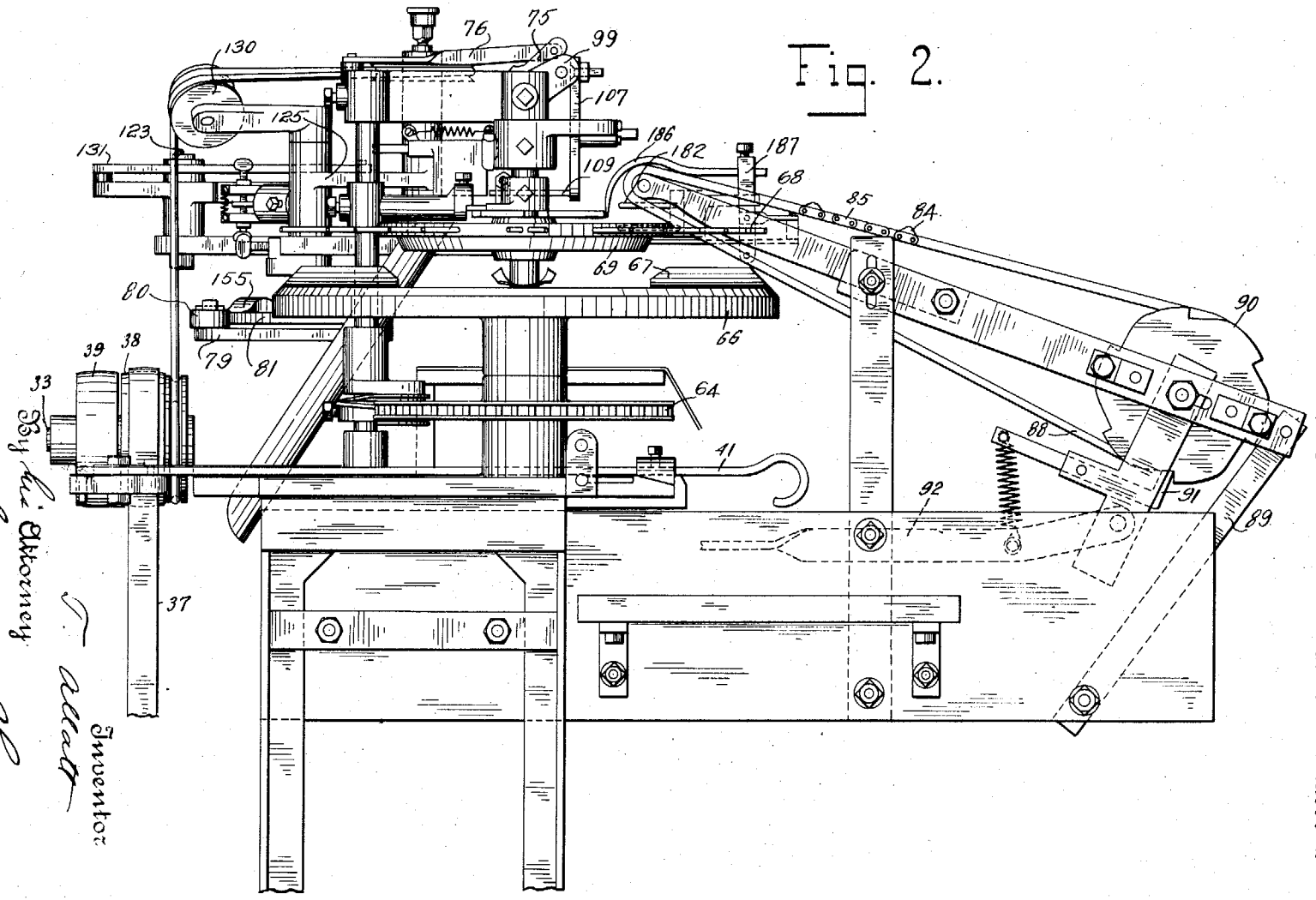
Figure 3:
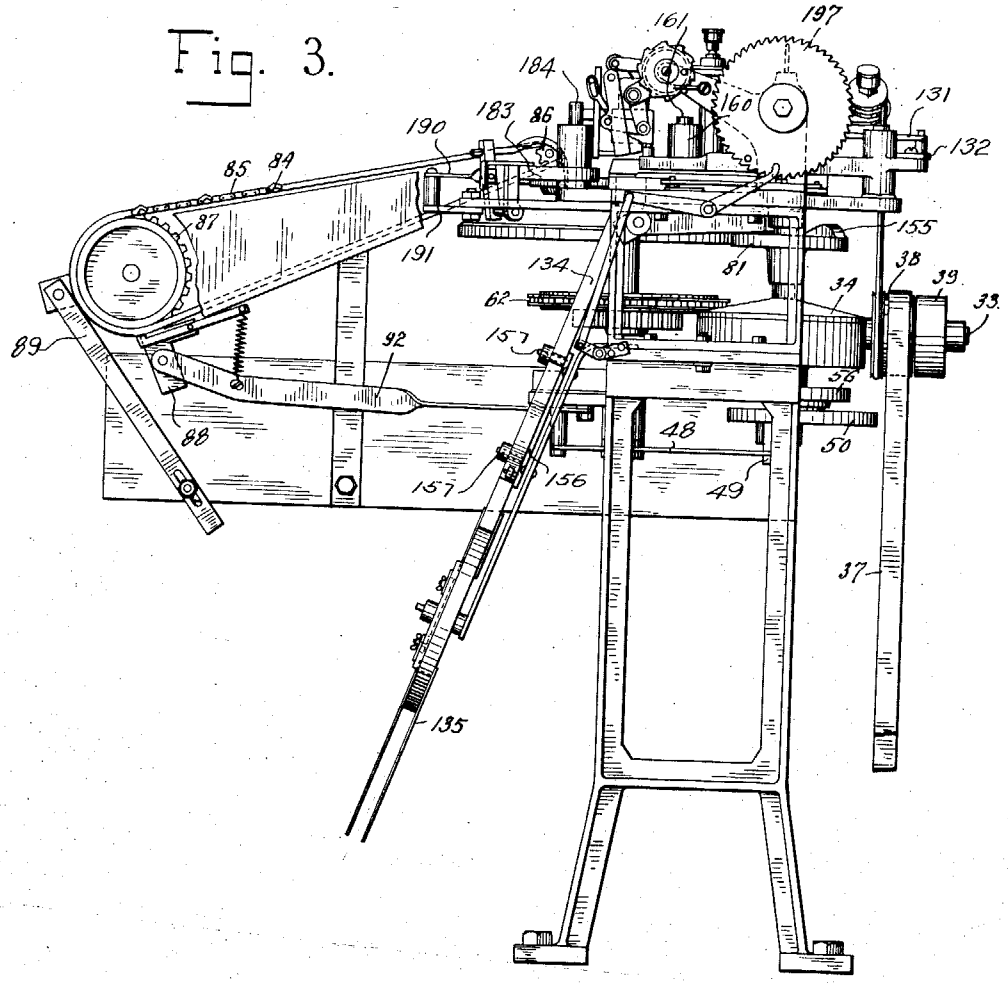
Figure 4:
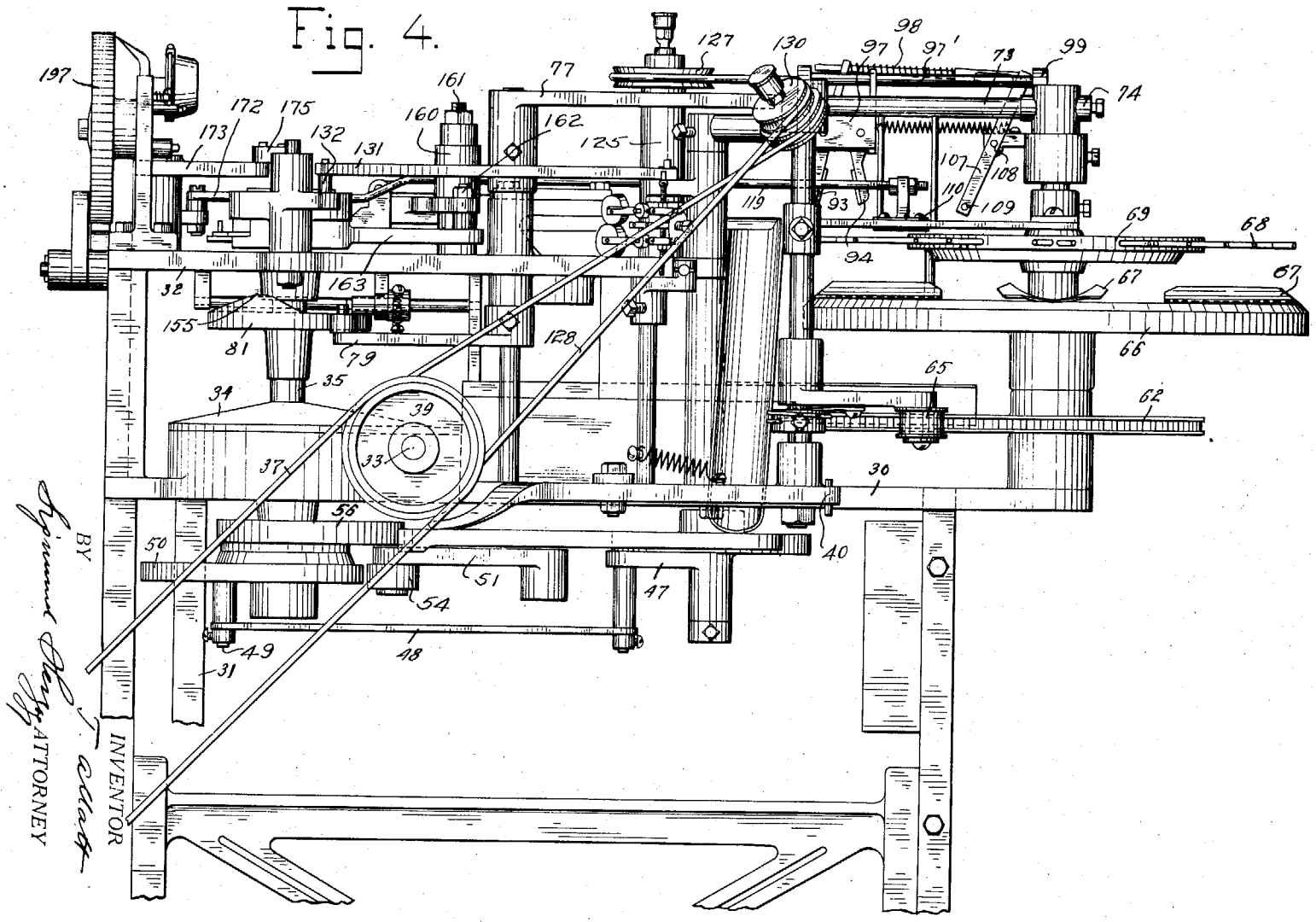
Figure 5:
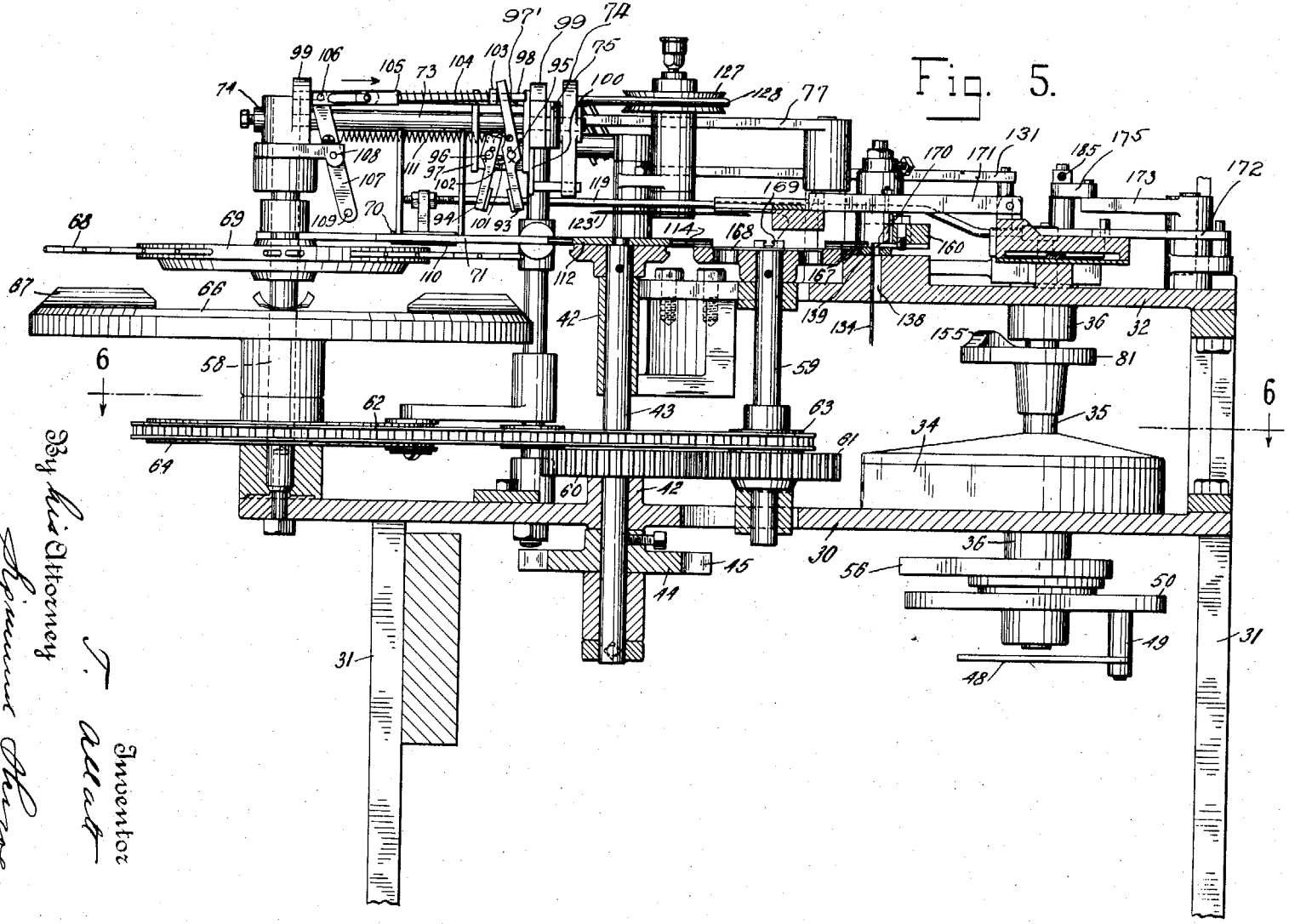
Figure 6:
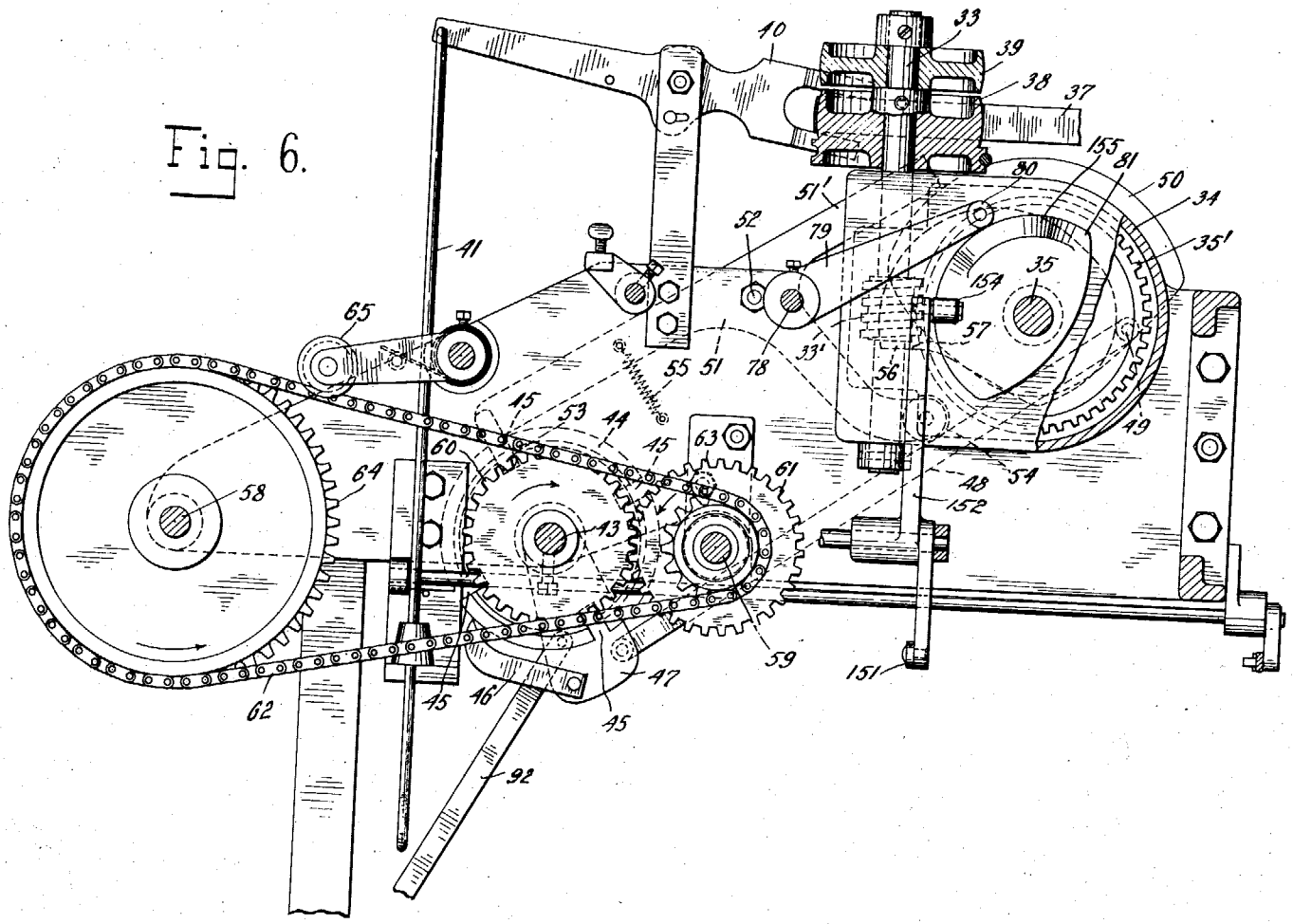
Figure 7:
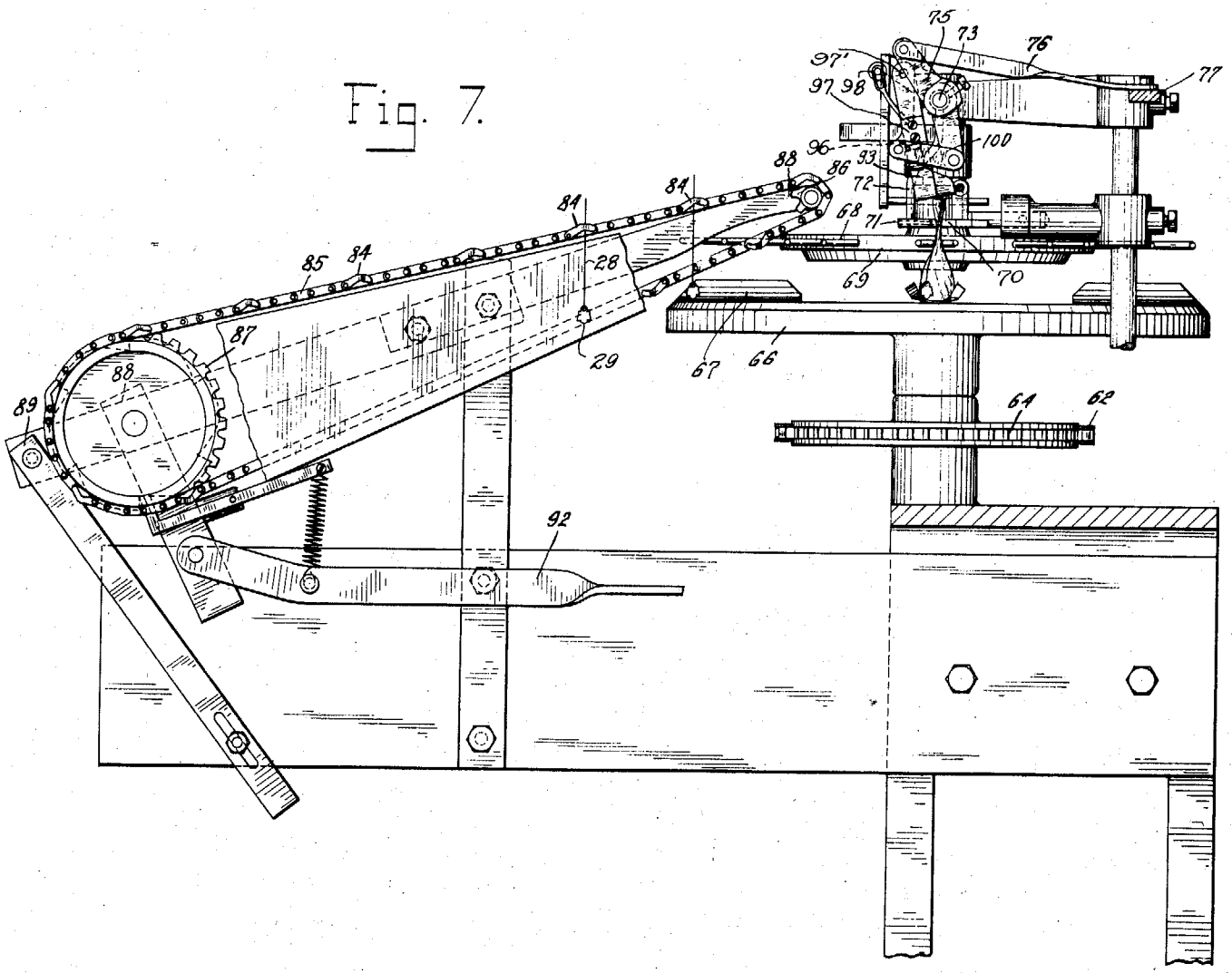
Figure 8:
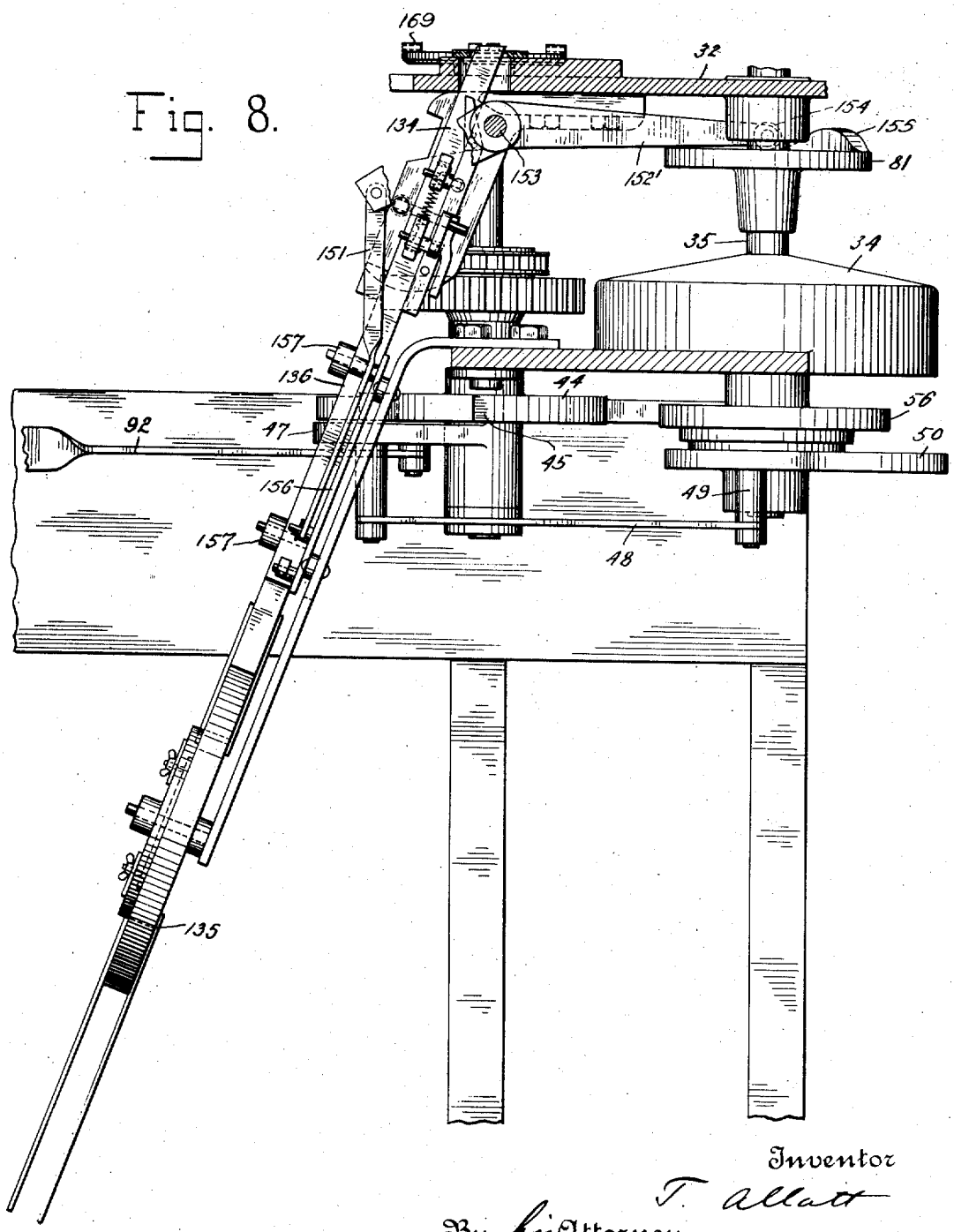
Figure 9:
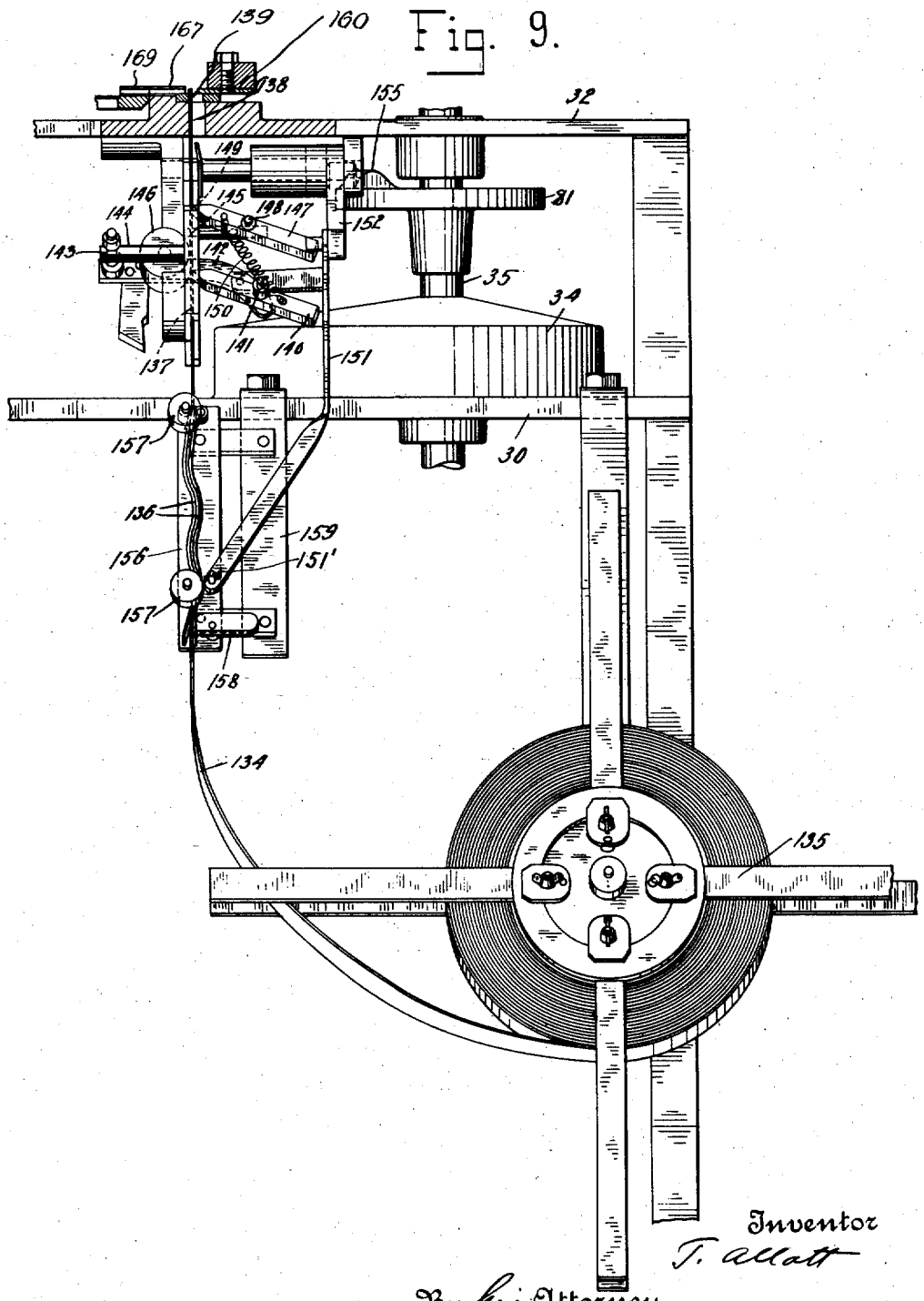
Figure 10:
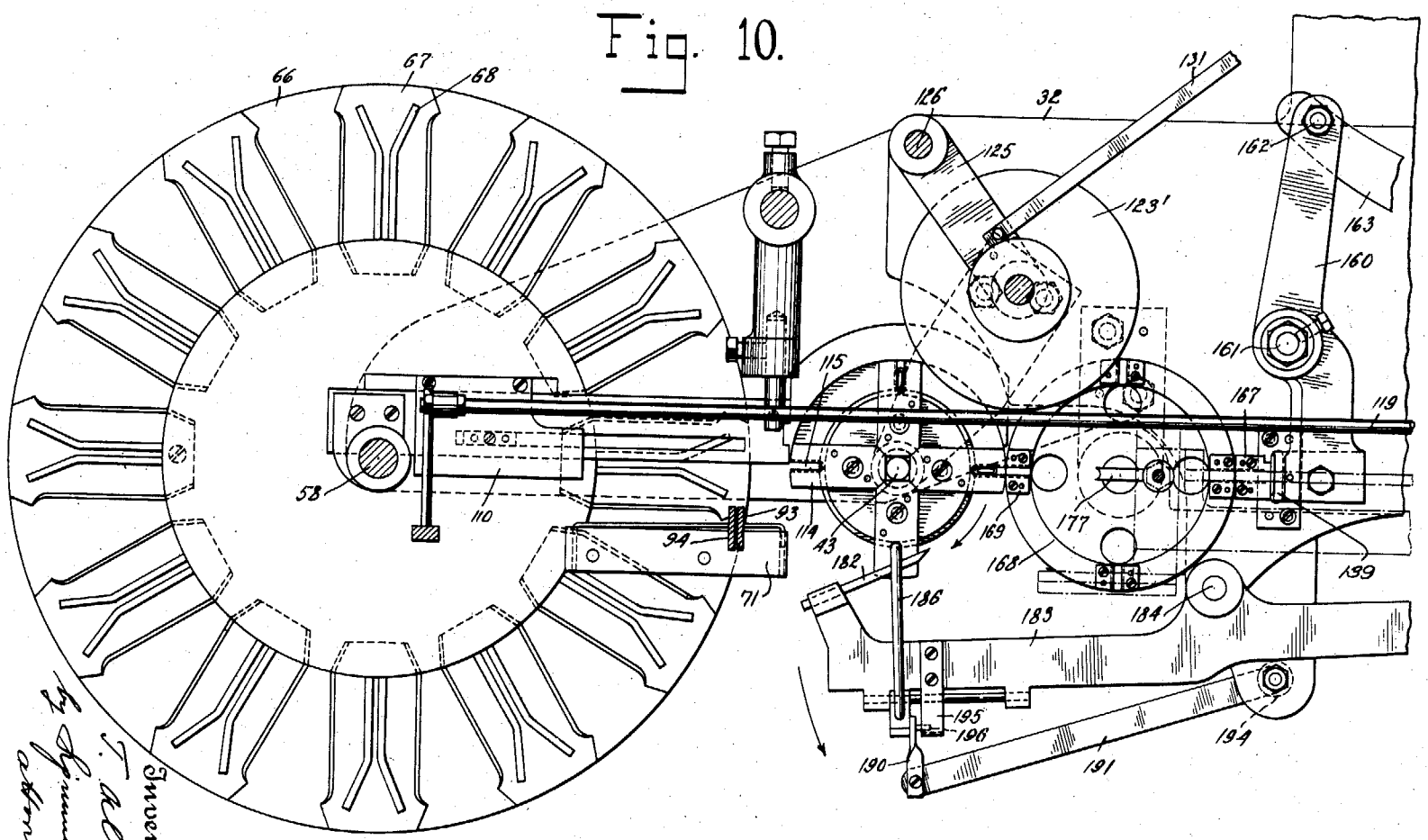
Figure 11:
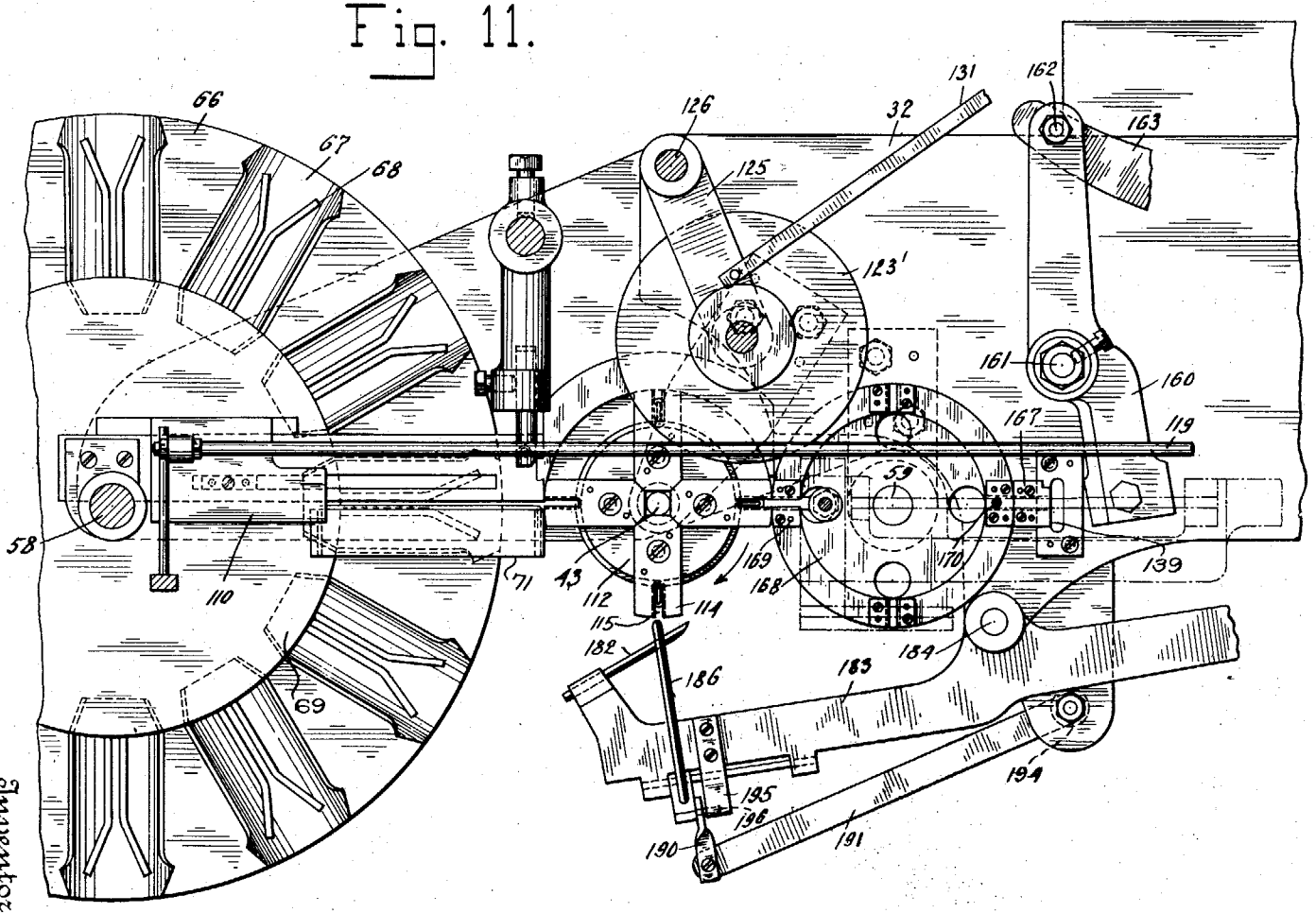
Figure 12:
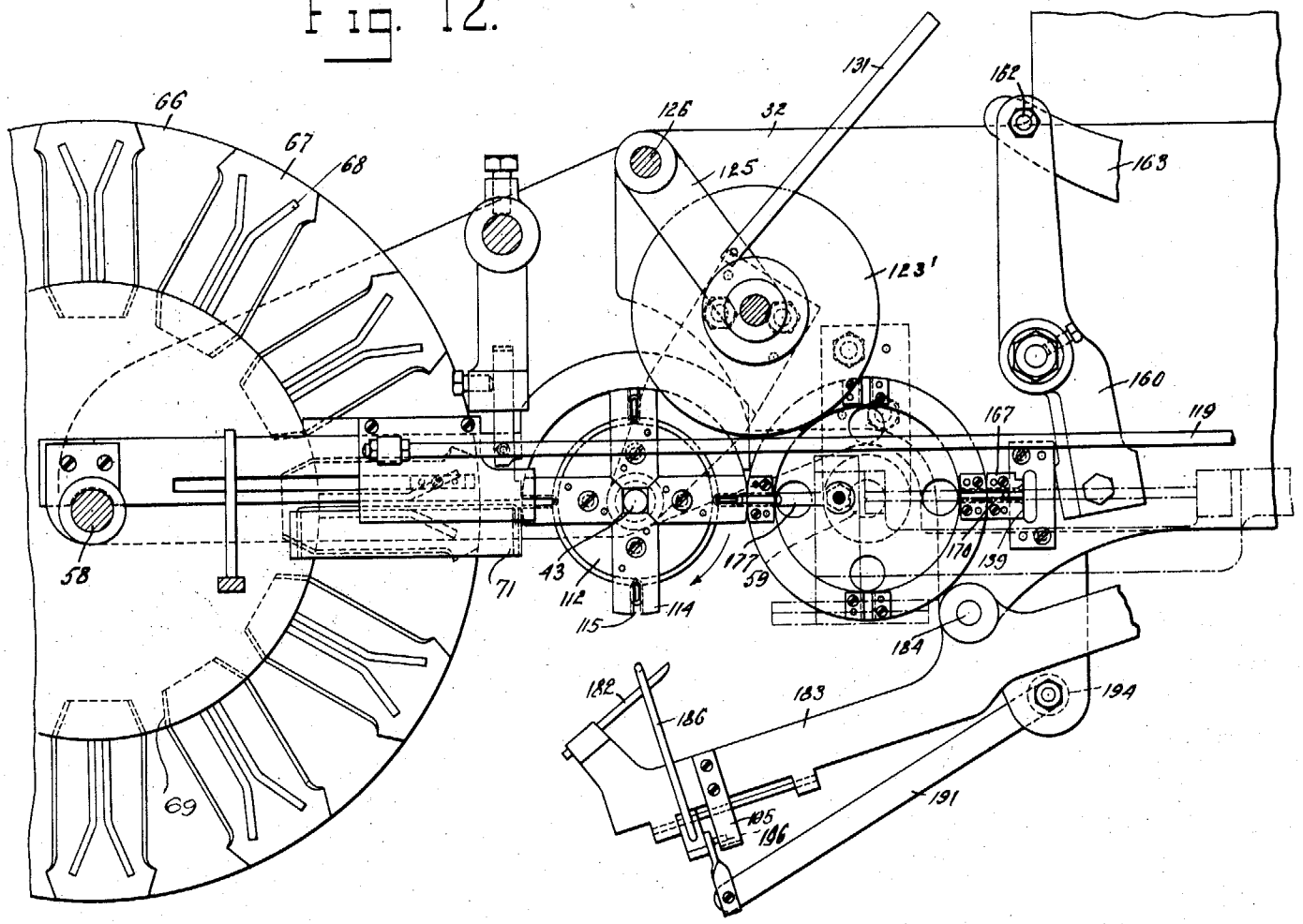
Figure 13:
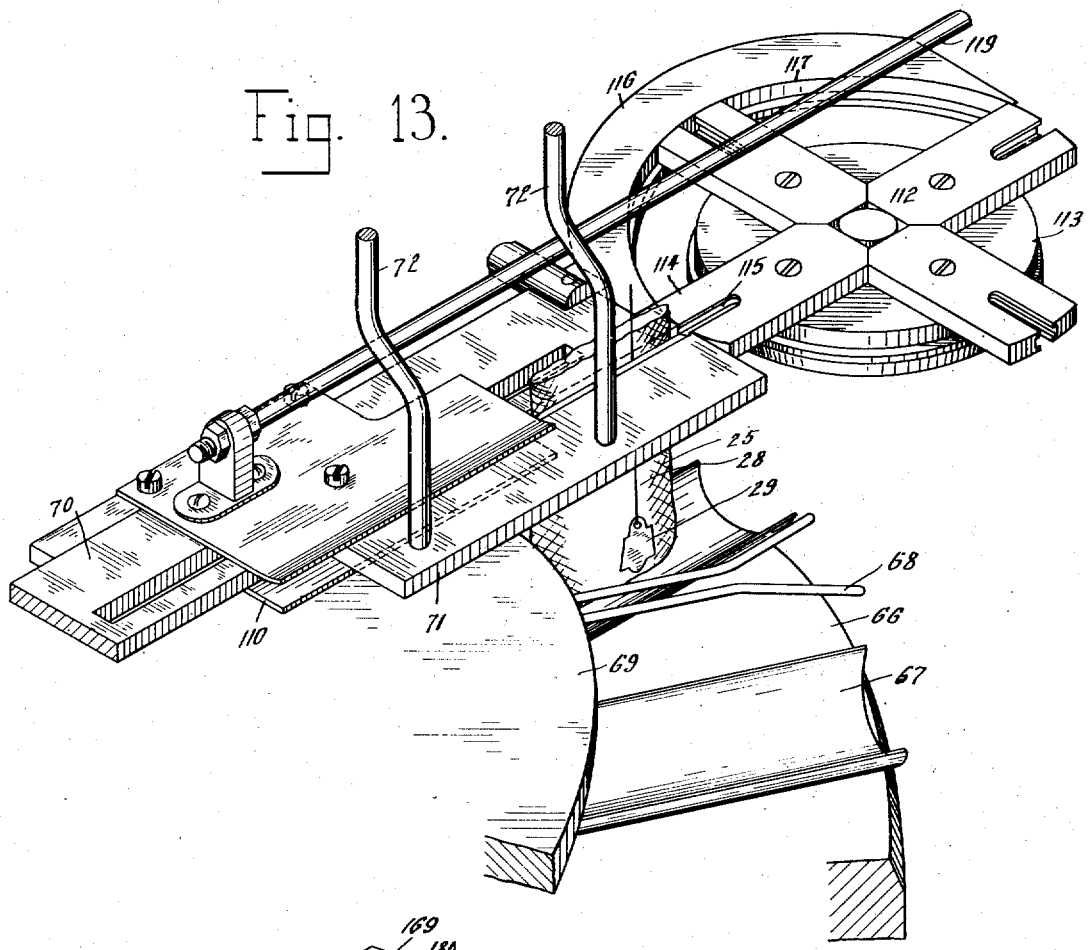
Figure 17:
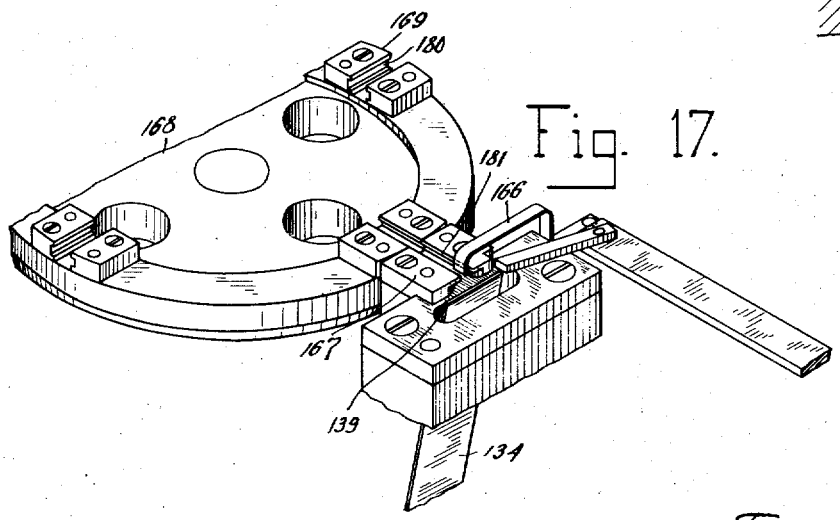
Figure 14:
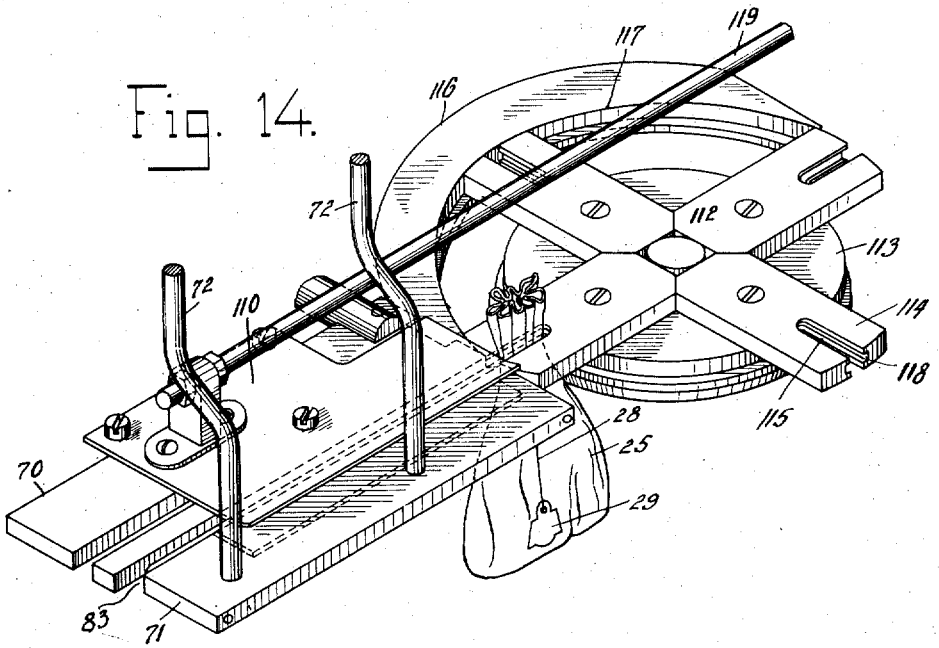
Figure 16:
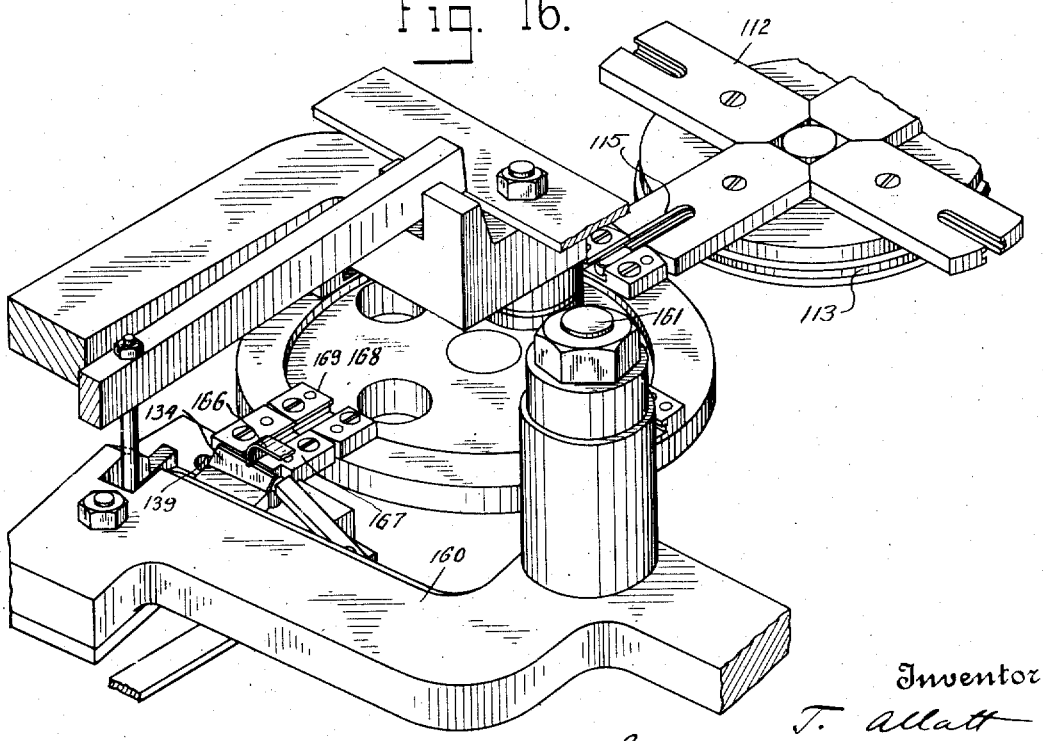
Figure 15:
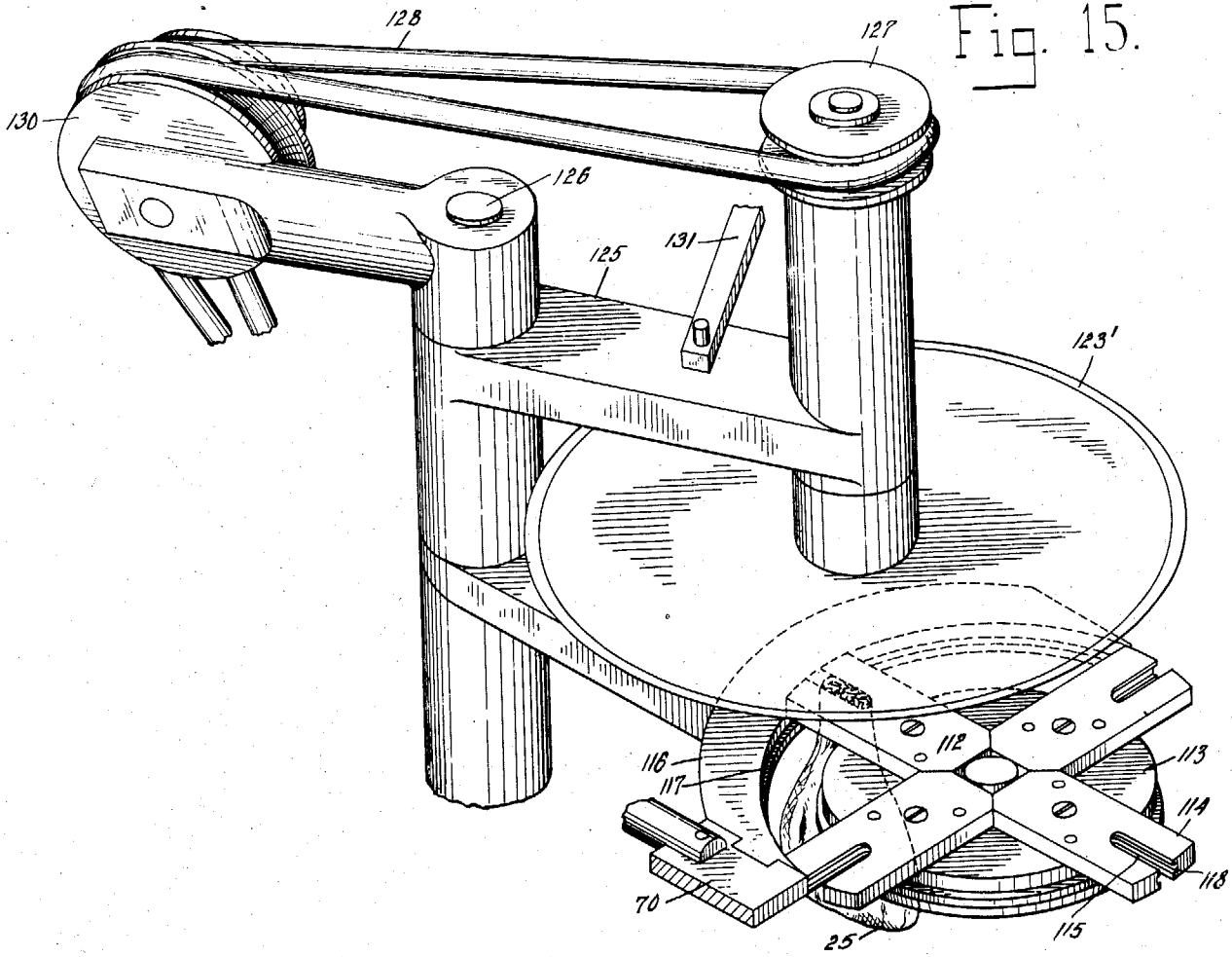
Figure 18:
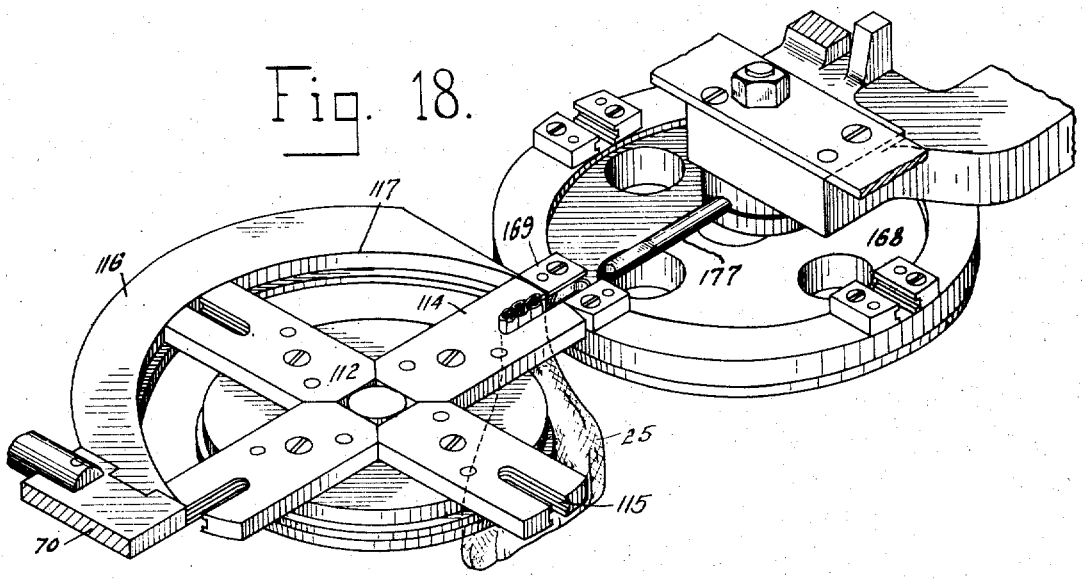
Figure 19:
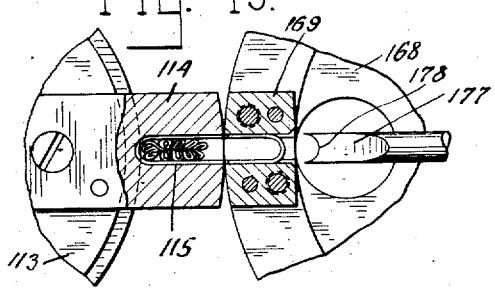
Figure 20:
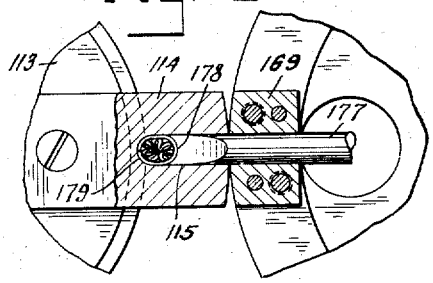
Figure 23:
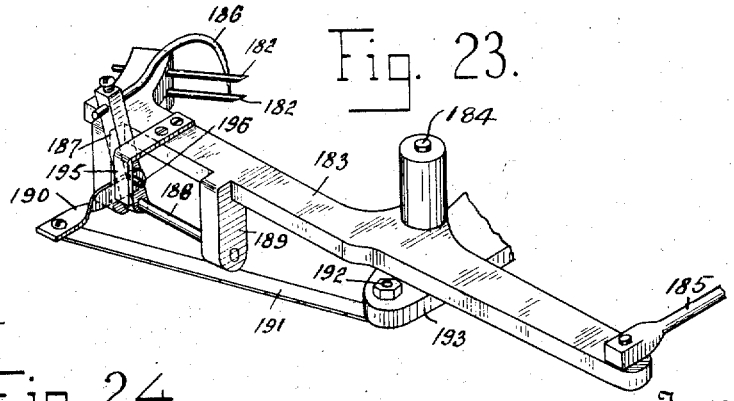
Figure 24:
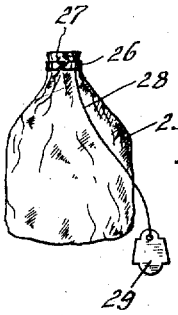
Figure 21:
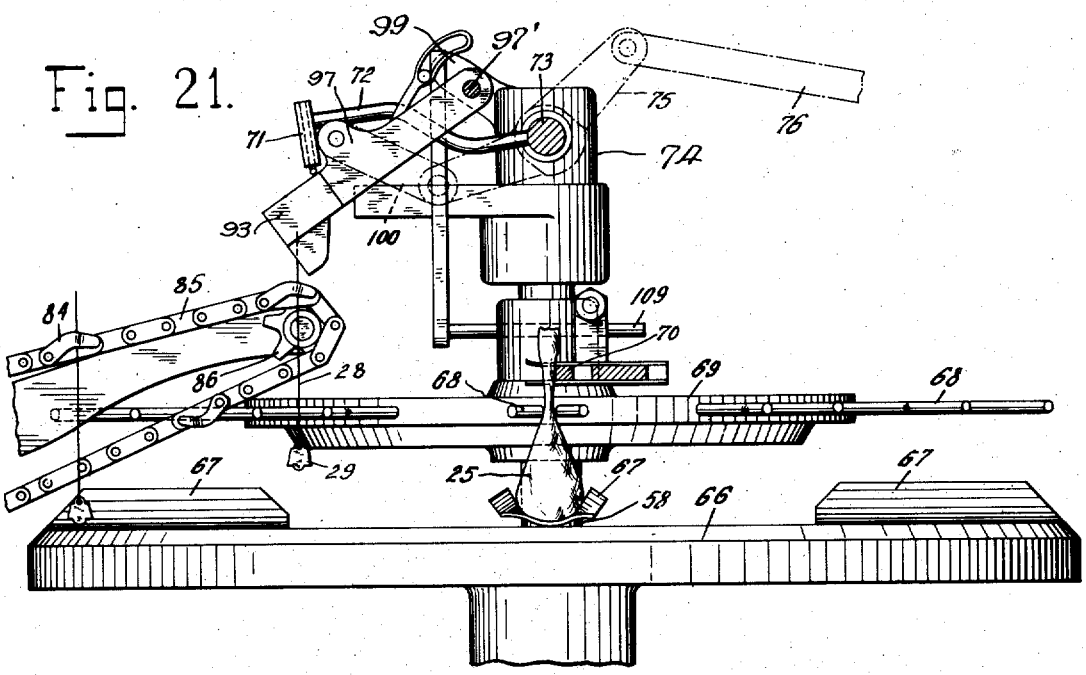
Figure 22:
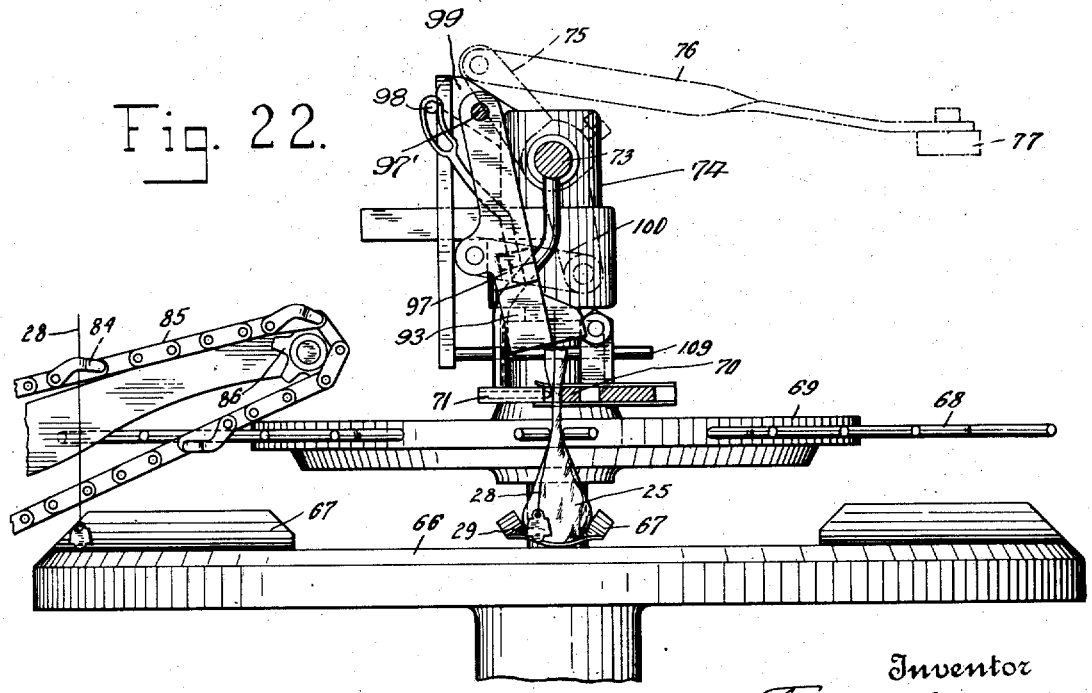

Figure 1 is a top plan view of a bag closing machine constructed in accordance with the present invention; Fig. 2 is a side elevation thereof; Figure 3 is also a side elevation of the machine, looking from the opposite side, on a smaller scale; Fig. 4 is a rear elevation of the machine; Fig. 5 is a section taken on line 5—5 of Fig. 1; Fig. 6 is a section taken on line 6—6 of Fig. 5; Fig. 7 is a section taken on line 7—7 of Fig. 1; Fig. 8 is a side elevation of the metal strip feeding means and the elements co-operating therewith, on a larger scale; Fig. 9 is a front elevation of the detail shown in Fig. 8; Fig. 10 is a top plan view, on a larger scale, of a portion of a machine; Figs. 11 and 12 are similar views of the same portion, the elements being shown in other positions; Fig. 13 is a perspective view of the bag puckering mechanism and the elements co-operating therewith; Fig. 14 is a perspective view of the same elements, they being shown in other positions; Fig. 15 is a perspective view of the bag trimming mechanism; Fig. 16 is a perspective view of the metal strip cutting device and the elements co-operating therewith; Fig. 17 is a perspective view of a detail of the device shown in Fig. 16; Fig. 18 is a perspective view of the closure applying dies; Fig. 19 is a top plan view, partly in section, of the said dies; Fig. 20 is a similar view of the said dies, in other positions; Fig. 21 is a side elevation of the mechanism for transporting strings and handles to the bags; Fig. 22 is a similar elevation, the elements being shown in other positions; Fig. 23 is a perspective view of an ejecting mechanism co-operating with the closure applying device; and Fig. 24 is an elevation of the finished product made on the machine.

Before describing the machine, the product made thereon will be disclosed. This product is illustrated in Fig. 24 of the drawings, and comprises a bag 25 of open-mesh textile fabric, such as cotton, and of a size to contain just sufficient tea-leaves or coffee for a single brewing. The mouth of the bag is closed by drawing or gathering the same into folds, and applying thereto a metallic band 26, that is shaped to assume the form of a ring, embracing the folded portion of the bag below its mouth, so as to prevent escaping of the contents. The ends of the metal strip are pointed or triangular, as shown at 27, and so arranged in relation to each other that the small gap between the same is disposed at an oblique angle to a plane at which one of the flat faces of the encircling ring is located. For the purpose of facilitating the handling of the cartridge, there is secured thereto a flexible means, for instance a string 28, to which is attached at its free end a handle 29, made for instance of cardboard. This string serves also as the means for suspending the cartridge from the receptacle, such as a tea-pot or coffee-pot, in which the extraction is to take place. The string is secured to the cartridge by placing it against the folds around the bag mouth before the band 26 is formed to constitute a ring-shaped closing means for the bag. While the ends of the ring do not meet, as shown in Fig. 24, the string 28 is under all circumstances securely held in place, the triangular ends of the band overlapping, as shown.

The bag closing machine comprises a frame, including a horizontal table portion 30, mounted upon legs or standards 31. Above this table portion and suitably spaced therefrom is held a horizontally extending plate member 32. A horizontally extending driving shaft 33 is journaled in a gear housing 34, which is disposed on the table portion 30. This shaft carries a worm 33′, in mesh with a worm gear 35′ on a vertical shaft 35, the latter being journaled in bearings 36 on the table 30 and frame member 32, and constitutes the main driving shaft of the machine. Rotation may be imparted to the shaft 33 in any suitable manner from any desired source of power, for instance, by the intermediary of a belt 37, running over a fixed pulley 38 on the shaft 33. On the last-mentioned shaft is also mounted a loose pulley 39, with a co-operating belt shifter 40 of any suitable construction, and including a bar 41, which extends to the front of the machine, so as to be within the reach of the operator.

In bearings 42 on the horizontal frame members 30 and 32 is rotatably mounted a vertical shaft 43, and to this shaft is fixed below the table 30 a wheel 44, having four equidistantly spaced notches 45 in its periphery. With these notches co-operates a spring-pressed pawl 46 on an arm 47, which is oscillatably mounted on the shaft 43 and connected by a rod 48 with a pin 49, carried eccentrically by a disk 50, the latter being fixed to the shaft 35 below the table member 30. By means of this mechanism intermittent movement is imparted from the shaft 35 to the shaft 43, the latter being caused to move step by step in the direction of the arrow shown in Fig. 6 of the drawings adjacent the same. With the wheel 44 co-operates a mechanism which holds the shaft 43 stationary during its periods of rest. This mechanism comprises a lever 51, fulcrumed at 52 to the table portion 30 and carrying upon one of its ends a pin 53, adapted to enter the notches 45 in the said wheel, and upon its other end an anti-friction roller 54, which co-operates with the disk 50, the latter being made in the form of a cam, as clearly shown in Fig. 6 of the drawings. This cam is so timed in relation to the pin 49 that the pin 53 is unseated from a notch in the wheel 44 immediately before the pawl 46 starts its feeding stroke. A spring 55, attached to the lever 51 and to a stationary part of the machine, causes the pin 53 to enter a notch immediately before the pawl 46 starts its return movement. In case the spring 55 is broken, obviously the pin 53 would not enter a notch in the wheel 44 and the shaft 43 and others connected thereto, which will hereinafter be described, would be permitted to overrun and cause breakage of the closure applying dies, in addition to throwing the co-operating elements of the machine out of gear. In order to prevent such occurrence, the lever 51 is provided with an extension 51′, with which co-acts a cam shaped disk 56, that is keyed to the shaft 35 and provided with a shoulder 57. If the spring 55 breaks and the lever 51 is not shifted to bring its pin 53 into one of the notches of the wheel 44, the extension 51′ is, in the rotation of the shaft 35, brought to bear against the shoulder 57, thereby preventing the shaft 35 from further movement, the belt simply slipping on the fixed pulley 38. After the broken spring has been replaced and the machine is again in order to run, the extension 51′ is swung out of the path of the shoulder 57, the machine running then in the regular manner.

In parallel relation to the shaft 43 there are mounted on the machine frame shafts 58 and 59. To these shafts intermittent rotation is imparted by the shaft 43. For this purpose the shaft 43 carries a gear 60, in mesh with a gear 61 on the shaft 59, these gears being of equal size whereby the shafts 43 and 59 move at the same speed in the opposite directions. The shaft 59 drives the shaft 58 by means of a chain 62, which runs over sprocket wheels 63 and 64 on the shafts 59 and 58, respectively. A tensioning device 65 of any suitable construction co-operates with the chain 62, for the well known purpose. The shafts 59 and 58 are thus rotated in the same direction, the ratio between the sprocket wheels 63 and 64 being, however, such that the shaft 58 rotates at a speed lower than that of the shaft 59.

To the shaft 58 is keyed, or otherwise attached, a horizontally extending table 66, arranged below the level of the frame portion 32 and having radially arranged equidistantly disposed troughs 67 on its upper surface. Above each trough is located a fork-shaped arm 68, attached to a disk 69, which is fixed to the shaft 58. The outer ends of the prongs of the forks diverge, as clearly shown in Fig. 1 of the drawings, to permit of a convenient insertion between the same of a filled bag with its mouth flat, the length of the parallel portions of a fork corresponding substantially to the width of the unpuckered mouth of a bag. The bags are inserted between the prongs of the fork-shaped arms with their open mouths extending a substantial distance above the said arms, they resting in the troughs 67 and being brought, one after another, in the intermittent movement of the shaft 58 against a stationary ledge 70, that is disposed above the arms 68 parallel to the longitudinal axis of the machine, the shafts 58, 43 and 59 being disposed in said axis, as clearly appears from Figs. 1 and 6 of the drawings. With the ledge 70 cooperates a jaw 71, fixed to two arms 72, which, in turn, are attached to a short horizontally extending shaft 73, the latter being oscillatably mounted in bearings 74. The shaft extends parallel to the ledge 70 and has fixed to it an arm 75, connected by a link 76 with a lever 77. This lever is fixed to a spindle 78, which extends through the frame member 32 and has fixed to it below the said frame member a lever 79, carrying an anti-friction roller 80, co-operating with a cam 81, mounted on the shaft 35. The cam 81, by the connections described, causes the jaw 71 to swing toward the ledge 70 when a bag is brought to rest against the said ledge, the jaw, together with the ledge, forming a guide, in the form of a passage 83, (Fig. 14), in which the bag is moved by means hereinafter to be described, toward the shaft 43, for a purpose which will hereinafter appear.

Before the jaw 71 is swung against the ledge 70, a string 28 and handle 29 thereon are brought against the open mouth of the bag. The strings with the handles thereon are engaged, by an operator, with spring clips 84 on a chain carrier 85, that runs over sprocket wheels 86 and 87, the carrier extending, preferably, at right angles to the longitudinal axis of the machine, the sprocket wheels being mounted in bearings 88, carried by an extension 89 of the machine frame. On the shaft of the sprocket wheel 87 is mounted a ratchet wheel 90, with which co-operates a spring-pressed pawl 91, that is connected by a link 92 with the arm 47, the arrangement being such that, when the shaft 43 is given a movement, the chain 85 is moved to bring one of the strings 28 and handle 29 within the reach of a pair of jaws, denoted by the numerals 93 and 94, which take hold of the string and transfer it to a bag, which rests against the ledge 70.

The jaws 93 and 94 are pivoted at 95 and 96, respectively, to a base member 97, that is oscillatably mounted on a spindle 97′, the latter being mounted on lugs 99 on the bearings 74. Through the jaw 93 extends loosely a spindle 98, carried by one of the lugs 99. The spindle 98 extends horizontally in parallel relation to the shaft 73, the pivot pins 95 and 96 extending at right angles to the said spindle. The base member 97 is connected by a link 100 with the arm 75, thereby causing the said jaws to move toward the sprocket wheel 86 when the jaw 71 is caused to move away from the stationary ledge 70 (Fig. 21), the jaws 93 and 94 being brought to bear against a bag, resting against the said ledge, before the jaw 71 reaches the said bag.

The jaw 93 is provided adjacent its pivot 95 with a projection 101, seated between two projections 102 on the jaw 94. On the spindle 98 is slidably mounted a collar 103, bearing against the jaw 93, and against this collar abuts one end of a spring 104, that is coiled around the said spindle, its other end bearing against a sleeve 105 on the said spindle. To this sleeve is pivoted at 106 a lever 107, that is fulcrumed at 108 to a stationary part of the machine frame, its free end carrying a pin 109, in the path of a slide 110. A spring 111 has one of its ends connected to the jaw 93 and its other end to the element to which the lever 107 is fulcrumed. The spring 111 is stronger than the spring 104, it thereby having a tendency to hold the jaws 93 and 94, by the intermediary of the projections 101 and 102, in their open positions, as shown in Fig. 5 of the drawings. When the slide 110, in its movement toward the shaft 58, swings the lever 107 around its fulcrum 108, the sleeve 105 is shifted in the direction of the arrow shown in Fig. 5 of the drawings, the movement being transmitted by the spring 104 and collar 103 to the clamp 93, which swings around its pivot 95 toward closing position, moving the jaw 94 also to closing position by the intermediary of the coacting projections 101 and 102. The slide 110 moves toward the shaft 58, as will hereinafter appear, when the jaws 93 and 94 are in their outer positions shown in Fig. 21 of the drawings, in which they are brought opposite a string 28 and handle 29 on the chain carrier 85, thereby gripping a string and handle, which are then transferred against the open mouth of a bag, resting against the ledge 70. When then the jaw 71 has been brought to bear against the said bag, the slide 110 moves toward the shaft 43, thereby releasing the lever 107 and permitting the spring 111 to open the jaws 93 and 94, thus releasing the string and handle.

The slide 110 moves on the ledge 70, overlapping the passage 83 between the said ledge and the jaw 71, when the latter is in its closing position shown in Fig. 13 of the drawings. The main purpose of the slide is to pucker the bag and transfer the same to a carrier 112, that is fixed to the shaft 43. This carrier comprises a disk 111 having four equidistantly spaced radial arms 114 on its upper face, each arm being provided on its outer end with a longitudinal slot 115, which are in the intermittent rotation of the carrier 112 brought in succession into alignment with the passage 83 above-mentioned. The arms 114 overhang the disk 113, the slide 110 shifting the mouth portion of the bag into the slot, whereby the said mouth portion is puckered, as shown in Fig. 14 of the drawings, the body of the bag depending from the respective arm 114, it being held in such position mainly by friction, and in puckered condition by a guide 116 on the table portion of the machine, said guide having an arc-shaped edge 117, against which the outer ends of the arms, in their rotation, bear. The edges of each slot 115 are provided with a longitudinal groove 118, for a purpose which will hereinafter appear.

The slide 110 is fixed to a rod 119, loosely pivoted at 120 to the strap 121 of an eccentric 122, the latter being fixed to the shaft 35, while the strap turns on a fulcrum pin 123 on the table portion of the machine. The eccentric 112 is so constructed that the slide is moved toward the carrier 112 when the latter is at rest, moving in the opposite direction while the said carrier transfers a bag to another element of the machine, more particularly toward a disk knife 123′. The knife 123′ is disposed a suitable distance above the upper face of the carrier 112, its spindle 124 being rotatably mounted in a swinging bearing 125, which is oscillatably mounted at 126 on the frame portion 32. To the knife spindle is fixed a pulley 127, over which runs a belt 128, the latter also running over a pulley 129, fixed to the shaft 33, guide sheaves 130 being provided for the well known purpose. The swinging bearing is connected by a link 131 to an extension 132 on the strap 121. When the carrier 112 has transported a bag through a distance corresponding to an arc of 90° and is brought to a full stop, the knife 123′ is swung toward the said bag, trimming the mouth portion thereof. After having done so, it is swung away from the bag. Suitable sharpening devices 133 are mounted on the machine, for co-operation with the knife.

The bag is now ready to receive the closing ring 26. The rings 26 are cut from a strip of metal 134 (Figs. 8 and 9), which is wound upon a supply reel 135, mounted suitably on the machine frame below its table portion. From this reel the strip is led upwards through straightening dies 136, and thence through a vertical guideway 137, through a slot 138 in the frame portion 32, said slot being disposed in the longitudinal center line of the machine at right angles thereto. The strip is led at an angle to the vertical plane, as clearly shown in Fig. 8 of the drawings, it being fed by means hereinafter to be described, step by step, above a stationary cutting edge 139 a distance which corresponds to the width of a closing ring. Due to this inclination of the strip, the metal bands cut therefrom have triangular ends 27, as above described. The feeding means comprises a dog 140, that is pivoted at 141 to a pawl 142, the latter, in turn, being fulcrumed at 143 to an extension 144 on the guide 137. This guide is provided with an opening 145, through which the feeding dog 140 projects into abutment with the strip 134. From the opposite side of the guide projects into the opening 145 a roller 146, carried by the pawl 142. With the feed dog 140 co-operates a presserdog 147, pivoted at 148 to an extension on the guide member 137. This presserdog projects through an opening 149 in the guide member into contact with the metal strip 134. Both dogs are under the tension of a spring 150. The presserdog prevents a shifting of the strip 134 when the feeding dog moves downwards, it clamping the strip against the guide 137, but permitting the strip 134 to move toward the cutting mechanism on the feeding stroke of the feeding dog. The pawl 142 is connected with a link 151, which is pivoted to a lever 152, the latter being fulcrumed at 153 to the machine frame and carrying an anti-friction roller 154, co-operating with a cam face 155 on the cam 81. The link 151 is also pivoted at 151′ to a plate member 156, the latter carrying the straightening dies 136. These dies are in the form of two sinuous spaced strips, between which the metal strip 134 is led, it being held between the dies by guide rollers 157 on the plate member 156. This plate member is connected by links 158 with a stationary frame element 159. When the horizontal arm 152′ of the lever 152 is moved upwards by the cam face 155, the feed dog 140 and its counterpart, that is to say the roller 146, move downwards on their idle stroke. When the lever 152 moves in the opposite direction, the strip 134 is fed above the stationary cutting edge 139 a distance which corresponds to the width of a closing ring or band 26. The straightening dies, when moving downwards, bend the metal strip 134 in both directions out of its normal plane, thereby removing therefrom the curvature, which it has acquired by reason of it being wound upon the reel 135.

With the stationary cutting edge 139 co-operates a knife 160, that is fulcrumed at 161 to the plate member 32, it being pivoted at 162, beyond the said fulcrum, to an extension 163 of the strap 164 of an eccentric 165, the latter being mounted upon the shaft 35. This eccentric is so timed that it moves the cutting edge of the knife 160 toward the stationary cutting edge 139 when the metal strip 134 is kept stationary, thereby cutting from the said metal strip a band 26. This band is held by a stop 166 (Figs. 16 and 17) in alignment with a slotted guide member 167, with which co-operates a carrier 168 on the shaft 59. This carrier is similar in construction to the carrier 112, it including four slotted radial arms 169, which are, in the intermittent rotation of the carrier 168, brought in succession into alignment with the guide member 167. With the slotted guide 167 co-operates a shaping die 170 (Fig. 5), in the form of a vertically disposed pin on a slide 171. This slide is connected by a link 172 with a bellcrank lever 173, that is fulcrumed at 174 to the plate member 32, the said bellcrank lever being connected by a link 175 with an extension 176, rigidly mounted upon the eccentric 122. When an arm of the carrier 168 is in alignment with the stationary guide 167, the slide 171 moves toward the carrier 112, the shaping die 170 engaging the metal band 26 at its middle portion, which is in alignment with the slot in the guide 167, and bending the band into U-shape as the shaping die moves through the slot in the said stationary guide, transferring it into a slot of the arm 169 in alignment with said guide. The U-shaped band is then carried, step by step, to a bag held on an arm 114 of the carrier 112 (Figs. 18 and 19). When the elements are in these positions, a horizontally disposed clenching die 177 on the slide 171 transfers the U-shaped band from the carrier 168 into the slot of the arm 114. This die is provided in its free end with a substantially semi-circular recess 178, the inner end of each slot 115 in an arm 114 being also substantially semi-circular, as shown at 179, (Figs. 18 to 20, inclusive), whereby the U-shaped band is caused to move around the puckered mouth of a bag, held on an arm 114, and caused to assume a ring shape, closing the said mouth and attaching thereto at the same time the string 28. The slots in the arms 169 and also the slot in the stationary guide 167 are provided with longitudinal grooves 180 and 181, respectively, just as the slots 115 in the arms 114 are provided with longitudinal grooves 118. These grooves serve as guides for the bands 26, and permit at the same time the band, after it is formed into U-shape, to pass around the puckered mouth of a bag.

The finished bag is then transported by the carrier 112, which rotates in the direction of the arrows shown adjacent the same in Figs. 10 to 12, inclusive, toward a stripping mechanism, which removes the bag from the said carrier. This stripping mechanism includes two horizontally extending pins 182 (Fig. 23), mounted upon a bell crank lever 183, which is fulcrumed at 184 to the plate member 32, it being connected by a link 185 with the extension 176 above mentioned. The pins 182 are so positioned that the arms 114 of the carrier 112 are adapted to move between the same, the lever 183 being so timed that, in its movement toward the carrier 112, the free end portions of the pins 182 are nearer to the center of the said carrier than the bags thereon, when the said carrier comes to a stop. When then the lever 183 is caused to move in the opposite direction, that is to say away from the carrier 112, it removes a finished bag from that arm of the last-mentioned carrier which has been brought to stop between the pins 182.

As it may happen sometimes that the arms of the carrier 112 do not contain bags while bands 26 in U-shape are supplied to the said carrier and formed therein into ring-shape, a mechanism is provided for removing the rings so formed from the carrier 112, to prevent a clogging of the slots 115 therein. This mechanism is associated with the lever 183 and comprises a hook-shaped element 186, fixed to a lever 187 (Fig. 23), the latter being oscillatably mounted upon a pin 188, that extends horizontally in hangers 189 on the lever 183. The lever 187 is connected by a link 190 to an arm 191, that is pivoted at 192 to a stationary lug 193 on the plate member 32. A friction disk 194, best shown in Figs. 10 to 12, inclusive, of the drawings, is inserted between the arm 191 and the lug 193, for a purpose which will presently appear. A stop 195 is carried by the lever 183, the said stop being in alignment with and in front of a pin 196, the latter serving also to attach the link 190 to the lever 187.

When the free end of the lever 183 arrives at its inner position (Fig. 10), the free end of the hook-shaped member 186 is in its raised position, that is to say farthest away from the upper face of the carrier 112, as will hereinafter appear. As then the lever 183 is moved around its fulcrum to strip a bag off the said carrier, that is to say when the said lever moves in the direction of the arrow shown in Fig. 10 of the drawings, the arm 191 does not immediately move with the said lever, because of friction between the same and the plate member 32. The lever 187 is thereby swung toward the lever 183, the pin 196 connecting the link 190 with the lever 187 being disposed above the pin 188, on which the lever 187 swings. The free end of the hook-shaped member 186 is thus lowered into the slot 115 in the arm 114, which is in alignment with the stripping mechanism. As the lever 183 continues its movement in the direction indicated, the lever 183 strikes the lever 187, carrying the same with it, with the free end of the hook-shaped member 186 in its lowered position. The hook-shaped member will thus remove from the carrier ring-shaped bands or other obstructions that might be held within the slots in the arms 114 thereof. When the arm 183 is then caused to move inwards, that is to say toward the carrier 112, the arm 191 lags behind, with the result that the hook-shaped member 186 is lifted. On the inward movement of the lever 183, the stop 185 strikes against the pin 196, whereby the hook-shaped member 186 and all the elements connected therewith are carried toward the carrier 112, the hook-shaped member remaining in its raised position until the lever 183 is again caused to move in the direction of the arrow shown in Fig. 10 of the drawings, when the cycle of operation now described is repeated.

A counting device 197 may be mounted on the machine and actuated by some moving element thereof. It is thought that, inasmuch as this counting device is not claimed herein, a further description thereof is unnecessary.

The operation of this device is as follows: The machine is operated by two attendants, one placing filled bags with their mouths flat on the fork-shaped arms 68, with the bags resting in the troughs 67 on the table 66, and the other operator engaging strings 28 with the spring clips 84 on the chain carrier 85. This carrier brings the said strings within the reach of the jaws 93 and 94, which transport them to the bags when the latter rest against the stationary ledge 70. The jaw 71 is caused to move against a bag and string, the slide 110, moving on the ledge 70, puckering the bag and transferring the same to the carrier 112. The bags move then, step by step, within the reach of the trimming knife 123′, and then into alignment with an arm of the carrier 168. This arm contains a U-shaped band 26, the same having been previously cut by the knife 160 from the metal strip 134. The U-shaped band is caused by the clenching die 177 to move around the puckered mouth of the bag, said clenching die, in co-operation with the substantially semi-circular recess 179 in an arm 169 of the carrier 168, forming of the said U-shaped strip a ring-shaped closure, which encircles and compresses the puckered mouth of the bag, attaching thereto a string 28.

What I claim is:—

1. A bag-closing machine, comprising a metal strip feeding means, an intermittently moving bag-supporting table, an intermittently moving carrier for receiving said bags from said table, means for transporting the bags from said table to said carrier and puckering the mouths thereof, a second carrier, a cutting mechanism for severing metal bands from said strip, means for forming each band into substantially U-shape and transporting the same to said second carrier, said second carrier moving intermittently and bringing said U-shaped bands into operative relation to the bags on said first-mentioned carrier, and co-acting dies for forming the bands into ring-shape and applying the same to the bags so as to encircle and compress the puckered mouths thereof.

2. A bag-closing machine according to claim 1, comprising a string carrier, and means for transporting the strings from said string carrier to the bags before their mouths are puckered.

3. A bag-closing machine according to claim 1, comprising a knife for trimming the mouth portions of the bags while on said first-mentioned carrier.

4. A bag-closing machine according to claim 1, comprising a knife for trimming the mouths of said bags before the closure ring is applied to the same.

5. A bag-closing machine according to claim 1, comprising a stripping mechanism for removing the closed bags from said first-mentioned carrier.

6. A bag-closing machine according to claim 1, comprising a reel from which the metal strip is led to said feeding means, and straightening dies between which the metal strip is carried by said feeding means.

7. A bag-closing machine, including a bag-supporting table, a ledge above said table, a clamp for holding a bag against said ledge, a carrier for receiving said bags from said table, and a slide for transporting the bags from said table along said ledge to said carrier and puckering the mouths thereof.

8. A bag-closing machine, including a bag supporting table, a ledge above said table, a clamp for holding a bag against said ledge, a carrier for receiving said bags from said table, a string carrier, means for transporting strings from said string carrier to said bags while resting against said ledge and before being held thereagainst by said clamp, and a slide for transporting the bags and strings from said table along said ledge to said carrier and puckering the mouths of said bags.

9. A bag-closing machine comprising a metal strip feeding means, a bag support, a carrier for receiving said bags from said support, means for transporting the bags from said support to said carrier and puckering the mouths thereof, a second carrier, a cutting mechanism for severing metal bands from said strip, means for forming each band into substantially U-shape and transporting the same to said second carrier, said second carrier bringing said U-shaped bands into operative relation to the bags on said first-mentioned carrier, and co-acting dies for forming the bands into ring-shape and applying the same to the bags so as to encircle and compress the puckered mouths thereof.

10. A bag-closing machine according to claim 9, comprising a string carrier, and means for transporting the strings from said string carrier to the bags before their mouths are puckered.

11. A bag-closing machine according to claim 9, comprising a knife for trimming the mouth portions of the bags while on said first-mentioned carrier.

12. A bag-closing machine according to claim 9, comprising a knife for trimming the mouths of said bags before the closure ring is applied to the same.

13. A bag-closing machine according to claim 9, comprising a stripping mechanism for removing the closed bags from said first-mentioned carrier.

14. A bag-closing machine according to claim 9, comprising a reel from which the metal strip is led to said feeding means, and straightening dies between which the metal strip is carried by said feeding means.

15. A bag support comprising a circular table, radially arranged equidistantly disposed troughs thereon, a disk above said table fixed in relation thereto, and fork-shaped arms attached to said disk in alignment with said troughs.

16. A bag-closing machine, including a carrier comprising an intermittently moving disk, equidistantly spaced arms projecting therefrom, each arm being provided on its outer end with a longitudinal slot receiving a bag, a lever, two horizontally disposed pins thereon, one above and the other one below said arms, and means for swinging said lever to and from said arms bringing said pins nearer to the center of said disk than the inner end of a slot in an arm before said carrier stops in its intermittent movement.

17. A bag-closing machine according to claim 16, comprising a hook-shaped element operatively connected with said lever, and means for causing said hook-shaped element to project into a slot in an arm of said carrier when said lever arrives at its innermost position in relation to said carrier.

18. A bag-closing machine, including a carrier, equi-distantly spaced means thereon for holding bags in puckered condition on said carrier, a knife in operative relation to said carrier, means for causing intermittent motion of said carrier so as to bring the bags thereon step by step to said knife, and means for causing said knife to move toward said carrier during each interval of rest of the latter.

19. A bag-closing machine, including a carrier, equi-distantly spaced means thereon for holding bags in puckered position on said carrier, means in operative relation to said carrier for closing thereon the puckered mouth of a bag, a knife also in operative relation to said carrier, means for causing intermittent motion of said carrier so as to bring the bags thereon step by step to said closing means and to said knife, and means for actuating said closing means and for causing said knife to move toward said carrier during each interval of rest of the latter.

20. A bag closing machine, including a carrier, means on said carrier for holding bags in puckered position thereon, means in operative relation to said carrier for closing thereon the puckered mouth of a bag, a knife also in operative relation to said carrier, means for causing intermittent motion of said carrier so as to bring the bag step by step to said closing means and to said knife, and means for actuating said closing means and for causing said knife to trim the mouth portion of a bag during each interval of rest of said carrier.

21. A bag closing machine according to claim 19, comprising a stripping mechanism for removing the closed bags from said carrier.

22. A bag closing machine according to claim 20, comprising a stripping mechanism for removing the closed bags from said carrier.

Signed at New York, in the county of New York, and State of New York, this 16th day of January, A. D. 1928.

THOMAS ALLATT.